United States Patent
Chami (10) Patent No.: US 9,142,811 B2
(45) Date of Patent: Sep. 22, 2015

(54) CURRENT COLLECTOR HAVING BUILT-IN SEALING MEANS, AND BIPOLAR BATTERY INCLUDING SUCH A COLLECTOR

(75) Inventor: Marianne Chami, Fontaine (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 76 days.

(21) Appl. No.: 13/704,854

(22) PCT Filed: Jun. 15, 2011

(86) PCT No.: PCT/EP2011/059943
§ 371 (c)(1),
(2), (4) Date: Dec. 17, 2012

(87) PCT Pub. No.: WO2011/157751
PCT Pub. Date: Dec. 22, 2011

(65) Prior Publication Data
US 2013/0089774 A1    Apr. 11, 2013

(30) Foreign Application Priority Data
Jun. 16, 2010   (FR) ..................... 10 54773

(51) Int. Cl.
*H01M 4/70* (2006.01)
*H01M 4/72* (2006.01)
(Continued)

(52) U.S. Cl.
CPC *H01M 2/08* (2013.01); *H01M 2/26* (2013.01); *H01M 4/043* (2013.01); *H01M 4/0404* (2013.01); *H01M 4/131* (2013.01); *H01M 4/136* (2013.01); *H01M 4/485* (2013.01); *H01M 4/5825* (2013.01); *H01M 4/66* (2013.01); *H01M 4/661* (2013.01); *H01M 4/667* (2013.01); *H01M 4/668* (2013.01); *H01M 4/72* (2013.01);
(Continued)

(58) Field of Classification Search
CPC ........... H01M 4/72; H01M 4/73; H01M 4/74; H01M 4/745; H01M 4/66; H01M 2/08; H01M 6/005
USPC .......... 429/143, 157–158, 210–211; 29/623.2
See application file for complete search history.

(56) References Cited

U.S. PATENT DOCUMENTS

| 5,554,459 A | 9/1996 | Gozdz et al. |
| 7,097,937 B2 | 8/2006 | Fredriksson et al. |

(Continued)

FOREIGN PATENT DOCUMENTS

| CN | 1732582 A | 2/2006 |
| EP | 2 073 300 A2 | 6/2009 |

(Continued)

OTHER PUBLICATIONS

International Search Report Issued Jul. 13, 2011 in PCT/EP11/59943 Filed Jun. 15, 2011.

(Continued)

*Primary Examiner* — Patrick Ryan
*Assistant Examiner* — Kiran Quraishi
(74) *Attorney, Agent, or Firm* — Oblon, McClelland, Maier & Neustadt, L.L.P.

(57) ABSTRACT

In lithium bipolar batteries, to improve sealing against electrolytes between adjacent electrochemical cells, mixed current collector-electrode supports are produced, in a form of a metal grate or raised metal sheet housed in a strip made of electrical insulator material, the function of the periphery of which is to constitute a sealing area.

21 Claims, 6 Drawing Sheets

(51) Int. Cl.

| | | |
|---|---|---|
| *H01M 4/73* | (2006.01) | |
| *H01M 4/74* | (2006.01) | |
| *H01M 2/08* | (2006.01) | |
| *H01M 2/26* | (2006.01) | |
| *H01M 4/04* | (2006.01) | |
| *H01M 4/131* | (2010.01) | |
| *H01M 4/136* | (2010.01) | |
| *H01M 4/485* | (2010.01) | |
| *H01M 4/58* | (2010.01) | |
| *H01M 4/66* | (2006.01) | |
| *H01M 10/0525* | (2010.01) | |
| *H01M 10/0585* | (2010.01) | |
| *H01M 6/00* | (2006.01) | |

(52) U.S. Cl.
CPC ............ *H01M4/745* (2013.01); *H01M 6/005* (2013.01); *H01M 10/0525* (2013.01); *H01M 10/0585* (2013.01); *H01M 4/0435* (2013.01); *Y02E 60/122* (2013.01); *Y10T 29/4911* (2015.01)

(56) References Cited

U.S. PATENT DOCUMENTS

| | | | |
|---|---|---|---|
| 7,163,765 | B2 | 1/2007 | Hosaka et al. |
| 7,220,516 | B2 | 5/2007 | Oosawa et al. |
| 7,279,248 | B2 | 10/2007 | Fukuzawa et al. |
| 7,320,846 | B2 * | 1/2008 | Watanabe et al. ............. 429/210 |
| 7,326,493 | B2 | 2/2008 | Martinet et al. |
| 7,335,448 | B2 | 2/2008 | Kaito et al. |
| 7,338,733 | B2 | 3/2008 | Morita et al. |
| 7,348,098 | B2 | 3/2008 | Hayashi et al. |
| 8,440,938 | B2 | 5/2013 | Chami et al. |
| 2005/0069768 | A1 | 3/2005 | Martinet et al. |
| 2005/0284750 | A1 * | 12/2005 | Nishimura et al. ........... 204/252 |
| 2006/0121348 | A1 | 6/2006 | Mizutani et al. |
| 2007/0004226 | A1 | 1/2007 | Tweet et al. |
| 2008/0057392 | A1 | 3/2008 | Takamatsu et al. |
| 2008/0060189 | A1 | 3/2008 | Daidoji et al. |
| 2008/0155813 | A1 * | 7/2008 | Dopp et al. .................. 29/623.5 |
| 2009/0159582 | A1 | 6/2009 | Chami et al. |
| 2009/0311587 | A1 * | 12/2009 | Best et al. ..................... 429/127 |
| 2014/0045040 | A1 | 2/2014 | Chami |

FOREIGN PATENT DOCUMENTS

| | | |
|---|---|---|
| FR | 2 832 859 A1 | 5/2003 |
| JP | 2000-243383 A | 9/2000 |
| JP | 2004-185813 A | 7/2004 |
| JP | 2004-253142 A | 9/2004 |
| JP | 2006-512722 A | 4/2006 |
| JP | 2008-84851 | 4/2008 |
| JP | 2008-140638 A | 6/2008 |
| JP | 2009 54484 | 3/2009 |
| JP | 2010-123565 A | 6/2010 |
| JP | 2010-203551 A | 9/2010 |
| JP | 2010 218985 | 9/2010 |
| WO | WO 03/047021 A2 | 6/2003 |
| WO | WO 2006/061696 A2 | 6/2006 |
| WO | 2007 118281 | 10/2007 |

OTHER PUBLICATIONS

U.S. Appl. No. 14/344,740, filed Mar. 13, 2014, Chami, et al.
Combined Chinese Office Action and Search Report issued Sep. 22, 2014 in Patent Application No. 201180038637.4 with English language translation.
Japanese Office Action issued Sep. 22, 2013 in Patent Application No. 2013-514701with English language translation.
French Preliminary Search Report issued Nov. 16, 2010 in Patent Application No. 1054773 (with English translation of categories of cited documents).

* cited by examiner

CURRENT COLLECTOR HAVING BUILT-IN SEALING MEANS, AND BIPOLAR BATTERY INCLUDING SUCH A COLLECTOR

TECHNICAL FIELD

The present invention relates to the field of lithium electrochemical generators, which operate according to the principle of insertion or deinsertion, or in other words intercalation-deintercalation, of lithium in at least one electrode.

It relates more specifically to a lithium electrochemical accumulator including at least one current collector with a bipolar function, also called a bipolar battery: in such a bipolar battery the bipolar collector supports on each of its opposite faces one of the electrode materials with the opposite sign, i.e. with a cathode (positive electrode) supported by one of the faces and an anode (negative electrode) supported by the other of the opposite faces.

The aim of the invention is to improve the sealing of the electrochemical generators against the electrolyte, and in particular to improve the sealing of a bipolar battery against an electrolyte in liquid form.

PRIOR ART

The architecture of conventional lithium-ion batteries is an architecture which may be qualified as monopolar, since it has a single electrochemical cell including one anode, one cathode and an electrolyte. Several types of monopolar architecture geometry are known:
  a cylindrical geometry such as the one disclosed in patent application US 2006/0121348,
  a prismatic geometry such as the one disclosed in U.S. Pat. No. 7,348,098, U.S. Pat. No. 7,338,733;
  a stack-based geometry such as the one disclosed in patent applications US 2008/060189, US 2008/0057392, and U.S. Pat. No. 7,335,448.

A monopolar architecture is achieved by winding. The winding consists of a current collector on which a positive electrode (cathode) material is continuously deposited, a separator made of polymer or ceramic material which is sandwiched within a negative electrode (anode) material, which is itself deposited on another current collector. The main advantage of this monopolar architecture is that it has a large active area of material, but the potential difference is limited to the unitary value of the potential difference between the two electrode materials used, which is also the case with a stack-based geometry.

To increase the average potential of a monopolar Li-ion accumulator, whilst retaining a comparable energy density, it is known to produce a battery with multiple electrochemical cells in series. The architecture of the battery is thus qualified as bipolar, since it includes a cathode of one cell and an anode of an adjacent cell, which are supported by the same current collector in the form of a plate, which is itself qualified as a bipolar electrode. The architecture of a bipolar battery is thus a connection in series of several monopolar accumulators through bipolar electrodes or current collectors with, however, the advantage that it has a lower electrical resistance compared to monopolar accumulators connected in series by external connectors. Many patent applications or patents concerning such bipolar batteries may be cited in this connection, such as U.S. Pat. No. 7,279,248, U.S. Pat. No. 7,220,516, U.S. Pat. No. 7,320,846, U.S. Pat. No. 7,163,765, WO 03/047021, WO 2006/061696 and U.S. Pat. No. 7,097,937.

The subsequent advantages of a bipolar battery are that they have lower mass and that they do not include superfluous volumes.

The main design difficulty of a bipolar battery is the production of compartments which are perfectly sealed against the electrolyte, in general in liquid form, from one another. Indeed, poor sealing causes bipolar batteries to malfunction.

This is, moreover, corroborated by the fact that most of the patent literature relating to the field of bipolar Li-ion batteries relates to sealing solutions to prevent leakages of electrolyte from one compartment to another (ion short circuits).

Among the patent applications or patents as mentioned above, U.S. Pat. No. 7,220,516 may be mentioned, which describes a solution with a flexible adhesive film 5, 6, glued on to the periphery of the bipolar collector. U.S. Pat. No. 7,320,846 may also be mentioned, which describes a solution involving coating collectors 4 and electrolytes 6 in a resin 10. U.S. Pat. No. 7,163,765 may also be mentioned, which describes a sealing solution with mixed struts 9 made of polyamide/PP, arranged between bipolar collectors, where the polyamide is cemented directly on to the periphery of the collectors at a certain distance from the cells). U.S. Pat. No. 7,097,937, for its part, proposes a double sealing solution, since an internal barrier 14, 22 made of a fluoropolymer is fitted on to the periphery of bipolar collector 11 and an external frame 18, 23 made of elastomer is fitted outside barrier 14, 22 on and around the bipolar collector with, possibly, an additional ring 15 made of elastomer fitted on collector 11. Lastly, patent application EP 2073300, in the applicant's name, may be mentioned, which proposes a solution where the dimensions of the plates are increased relative to the one adjacent to them, and the sealing devices interposed between the interconnecting plates are offset transversely in order that two seals are not located in line with one another in the stacking axis of the cells.

The previously envisaged solutions to improve the mutual sealing of compartments against the electrolyte in a Li-ion bipolar battery may thus be summarised as follows:
  systematic production of the bipolar current collector, also called the bipolar electrode, in the form of a plate,
  use of various adhesives or resins on the periphery of the plate,
  increase of the bipolar current collector plate format to create an additional barrier against the electrolyte.

The aim of the invention is to propose a solution different to the ones previously envisaged to improve the sealing of the compartments between one another against the electrolyte in a Li-ion bipolar battery.

Another aim of the invention is to propose another solution for sealing the compartments between one another against the electrolyte in a Li-ion bipolar battery, which is simple to produce.

DESCRIPTION OF THE INVENTION

To accomplish this, the object of the invention is a device for a lithium electrochemical generator, including a strip made of electrical insulator material including at least one polymer and one metal grate, or one raised metal sheet, forming a current collector, housed in the strip, and flush on both its faces, where the periphery of the strip has no grate or raised sheet, and where at least one of the flush portions of the grate or the raised sheet is covered with an electrode made of lithium insertion material.

"Flush" on both these faces is understood to mean, in this case and in the context of the invention, that a portion at least of the sheet or metal grate emerges at the surface of the strip, and that there is continuity of electrical conduction by means of material continuity of the material forming the sheet or grate all the way through the strip.

According to the invention, the sealing means are thus in some way built into a part, the function of which is to be a current collector. In other words, a novel semi-finished product of a battery is in some way defined, which incorporates simultaneously:

the current collector which, when it is bipolar, provides the electrical conduction between the cathode of one cell and the anode of an adjacent electrochemical cell, i.e. stacked immediately below or above, a peripheral area made exclusively of electrically insulated materials which, when assembled, contributes to producing the seal against the battery's electrolytes. It is self-evident that in the context of the invention the skilled man in the art will take care to define one or more insulating materials (polymer(s)) which do not creep within the operating temperature ranges of a bipolar battery.

A device according to the invention may be between 10 and 100 µm thick, and preferably between 25 and 50 µm thick.

A device according to the invention may have any geometrical form, such as a section of polygonal shape, for example a rectangle or a square, with an area with no grate or sheet, as defined above, fitted on the periphery.

Planar dimensions may be envisaged the length of which is between 40 and 70 cm, and typically of the order of 50 cm, and the width of which is between 10 and 25 cm, and typically of the order of 15 cm. The peripheral area without any sheet or grate according to the invention can advantageously form a frame measuring between 1 mm and 10 cm in width, and more particularly between 3 mm and 12 mm, and typically of the order of 5 mm. The peripheral area having no sheet or grate according to the invention may represent an area of less than 25% of the total area of the device, preferably less than 20%, and even more preferably less than 15%.

The proposed mixed current collector/peripheral sealing area semi-finished product according to the invention is a technological breakthrough with what has been proposed hitherto, and which consisted in always producing the collector in the form of a plate and of attaching a sealing device to it. The device according to the invention therefore enables leak-proofing itself to be simplified, and a substantial mass gain to be contributed (due to the removal of the plate as a collector) and, hence, a substantial improvement in efficiency to be accomplished. Indeed, on an equal mass basis, the energy density of a battery according to the invention is greater, and improved performance is therefore obtained for the said battery. In addition, since the sealing of the battery is improved the battery is more efficient.

According to one variant, the majority polymer constituting the strip is a polyolefin.

The strip may include at least one other polymer, where the said other polymer is interposed between the polyolefin and the current collector to improve the attachment between them.

According to another variant, the other polymer may be chosen from among a polyester or a polyurethane.

The strip may also include at least one adherence promoter, where the said adherence promoter is interposed between the polyolefin and the current collector to improve the attachment between them.

The majority polymer constituting the strip may also be a two-component resin, preferably an acrylic resin. Indeed, acrylic resin has excellent mechanical properties in contact with carbonate electrolytes.

According to one variant, the polymer may be chosen from among the polyamide-imide (PAI), polyether-imide (PEI), polyether-sulfone (PES) and polyether-ether-ketone (PEEK) thermoplastics.

Depending on the type of lithium insertion electrode materials chosen, the current collector formed by the grate or metal raised sheet may be made of aluminium or electroplated on the surface of another metal; it may for example be made of aluminium superimposed on copper.

The metal grate may have a regular mesh.

The current collector is preferably shaped as a frame centred in the strip made of insulating material.

When the current collector of the device is intended to be bipolar, both flush portions of the grate or raised sheet are covered with an electrode made of lithium insertion material.

An "electrode made of lithium insertion material" is understood to mean, here and in the context of the invention, an electrode including at least one lithium insertion material and at least one polymer binder. The electrode may possibly include, in addition, an electronic conductor, for example carbon fibres or carbon black.

"Lithium insertion material", in particular for the positive electrode, is understood, here and in the context of the invention, to be a material chosen from among the lithiated oxides including manganese having a spinel structure, the lithiated oxides having a lamellar structure, and blends of these latter structures, and lithiated oxides with polyanionic structures of formula $LiM_y(XO_z)_n$, where M represents an element chosen from among Mn, Fe, Co, Ni, Cu, Mg, Zn, V, Ca, Sr, Ba, Ti, Al, Si, B and Mo, and X represents an element chosen from among P, Si, Ge, S and As, and where y, z and n are positive integers.

Lithium insertion material, in particular for the negative electrode, is also understood to mean a material chosen from among: Titanium oxide, whether or not lithiated, for example Li4Ti5O12 or TiO2.

More particularly, the negative electrode material may be chosen from among the carbonaceous materials, the non-lithiated titanium oxides, and their derivatives, and the lithiated titanium oxides, such as Li4Ti5O12, and their derivatives, and a blend of these latter.

"Lithiated derivative" is understood to mean, here and in the context of the invention, compounds of formula $Li_{(4-x1)}M_{x1}Ti_5O_{12}$ and $Li_4Ti_{(5-y1)}N_{y1}O_{12}$, where x1 and y1 are respectively between 0 and 0.2, and M and N are respectively chemical elements chosen from among Na, K, Mg, Nb, Al, Ni, Co, Zr, Cr, Mn, Fe, Cu, Zn, Si and Mo.

"Non-lithiated derivative" is understood to mean, here and in the context of the invention, $Ti_{(5-y1)}N_{y1}O_{12}$, where y1 is between 0 and 0.2, and N is a chemical element chosen from among Na, K, Mg, Nb, Al, Ni, Co, Zr, Cr, Mn, Fe, Cu, Zn, Si and Mo.

When the current collector of the device is intended to be monopolar, a single one of the flush portions of the grate or raised sheet is covered with an electrode made of lithium insertion material.

The invention also relates to a bipolar battery including at least two electrochemical cells stacked one on the other, and at least one device described above, with both flush portions each covered with an electrode, in which one of the two flush portions of the current collector is covered with the anode made of lithium insertion material of one of the two cells and the other of the two flush portions of the current collector is covered with the cathode made of lithium insertion material of the other of the two cells, and where the periphery of the strip made of at least one polymer constitutes a peripheral area of a wall sealed against the electrolytes of the two cells surrounding these electrolytes.

Such a battery also advantageously includes at least one device described above with a single one of the flush portions covered with an electrode, where the other of the two flush portions which is not covered by an electrode is in contact with a terminal current collector.

The dimensions of the current collectors are chosen such that they are roughly equal to those of all the electrodes.

The anodes are preferably made of $Li_4Ti_5O_{12}$ and the cathodes of LiFePO4.

Lastly, the invention relates to a method for producing a bipolar battery including at least two electrochemical cells stacked one on the other, including the following steps:
- a/ production of a device as described above, with both flush portions covered with an electrode made of lithium insertion material and two devices of which a single one of the flush portions is covered with an electrode made of lithium insertion material, such that:
  - one of the flush portions of the current collector of one of the two devices described above is covered with an anode made of lithium insertion material,
  - one of the flush portions of the current collector of the other of the two devices described above is covered with a cathode made of lithium insertion material and,
  - one of the flush portions of the current collector of the device described above is covered with a cathode made of lithium insertion material, whereas the other of the flush portions of the current collector of the device described above is covered with an anode made of lithium insertion material,
- b/ stacking of the three devices, with sandwiching of a separator between two adjacent ones, where the stacking with sandwiching is accomplished such that:
  - the anode of one of the two devices described above is facing the cathode of the device described above, and the devices are separated by a first separator,
  - the cathode of the other of the two devices described above is facing the anode of the device described above, and the devices are separated by a second separator,
- c/ pressing of the peripheries of the three strips of the devices the ones against the others, each of the separators being impregnated with an electrolyte,
- d/ keeping the three strips pressed the ones against the others in order to constitute a wall which is sealed against the electrolytes of the two cells surrounding the latter.

"Separator" is understood to mean, here and in the context of the invention, an electrical insulator, and ion conductor, formed by at least one polymer material such as vinylidene polyfluoride (PVDF), vinyl polyacetate (PVA), methyl polymethacrylate (PMMA), polyoxyethylene (POE), terephthalate polyethylene (PET), or a polymer chosen from among the polyolefins such as polypropylene, polyethylene or cellulose.

The electrolyte according to the invention may be a liquid formed by a blend of carbonate and at least one lithium salt. "Lithium salt" is understood to mean, preferably, a salt chosen from among LiPF6, LiClO4, LiBF4 and LiAsF6.

Alternatively, the electrolyte may include one or more ion liquids, with lithium ions, namely a salt consisting of lithium cations, complexed with inorganic or organic anions, one property of which is that it is at the liquid state at ambient temperature. An ion liquid, depending on the nature of the anion, may be hydrophilic or hydrophobic.

As examples of ion liquids, one may mention ion liquids with hydrophobic anions, such as trifluoromethanesulfonate $(CF_3SO_3)$, bis(trifluoromethanesulfonate imide $[(CF_3SO_2)_2 N]$ and tris(trifluoromethanesulfonate) methide $[(CF_3SO_2)_3 C]$.

As regards the step of impregnation of the separator by the electrolyte, it may be envisaged either to do so before stacking, i.e. to have impregnated the separator by the electrolyte when it is installed (sandwiching), or after the stack according to step b/ has been completed.

According to one embodiment of the invention, several devices including an electrode on each face can be used so as to create n electrochemical cells in a bipolar battery according to the invention, where n is a positive integer. Positive integer n may be equal, for example, to 13, which then implies the production of a number equal to 12 devices according to the invention, where each has an electrode on each face. In other words, a bipolar battery including n electrochemical cells stacked individually on each other may be produced, by accomplishing abovementioned steps a/ to d/ with (n−1) devices, each with an electrode on each face and two devices, at the ends of the stack, where each has a single electrode on one face.

Steps c/ and d/ may be accomplished advantageously and simply according to two alternatives:
- either through installation of the rigid packaging of the bipolar battery,
- or by heat-sealing using a U-shaped jaw around the peripheral portions of the strips made of electrical insulator material.

Deposition of at least one electrode on one of the flush portions of at least one of the devices may be accomplished by a habitual printing technique, such as screen printing, heliography, flexography, spraying, etc.

The electronic conduction of the current collector according to the invention in the form of a grate or raised sheet can be improved by using narrow grate or raised meshes, or surface electroplating of the grate or raised sheet.

BRIEF DESCRIPTION OF THE ILLUSTRATIONS

Other advantages and characteristics will be seen more clearly on reading the detailed description given for illustrative purposes, made with reference to the following figures, among which.

DETAILED ACCOUNT OF PARTICULAR EMBODIMENTS

Figure 1:
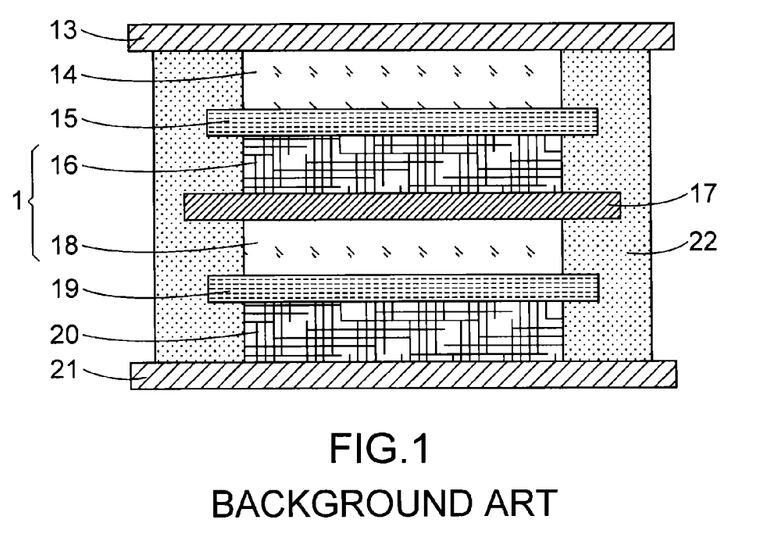
FIG. 1 is a schematic, lengthways section view of a lithium bipolar battery according to the state of the art.
Figure 2A:
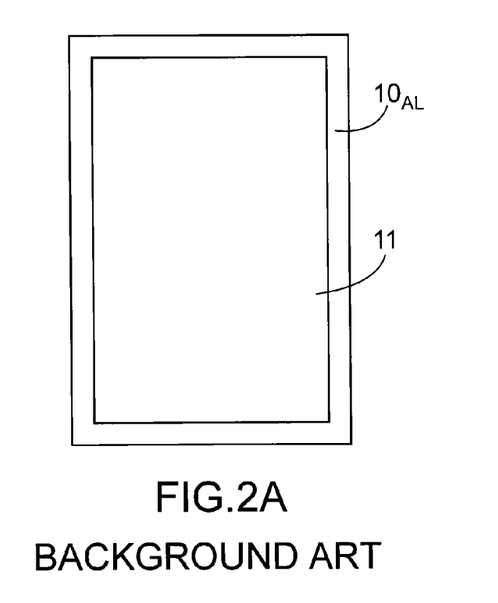
FIGS. 2A and 2B are respectively front and section views of a bipolar current collector used in a lithium bipolar battery according to the state of the art.
Figure 2B:
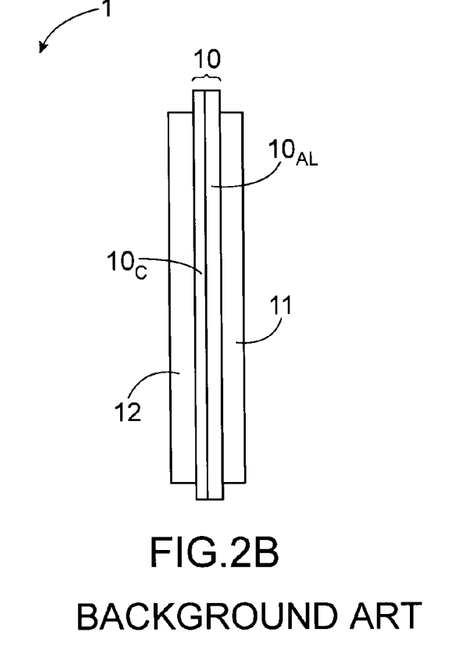

A Li-ion bipolar battery according to the state of the art has been represented in FIG. 1, such as it is illustrated in patent application WO 03/047021.

This battery includes in its upper portion a conductive aluminium substrate 13 (positive terminal current collector) and an active layer 14 made of a positive lithium insertion material, such as $Li_{1.04}Mn_{1.96}O_4$, and in its lower portion a conductive aluminium substrate 21 (negative terminal current collector) and an active layer 20 made of a positive lithium insertion material, such as $Li_4Ti_5O_{12}$.

Within this battery, a bipolar electrode 1, also called a bipolar current collector, includes a positive active layer 18 and a negative active layer 19, either side of a conductive aluminium substrate 17 in the form of a plate.

Lower 20 and upper 14 electrodes are separated from bipolar electrode 1 by two separators 15, 19, in which an electrolyte is present in a liquid or gel form. Sealing against the electrolytes of the battery between the two constituted adjacent electrochemical cells 14, 15, 16 and 18, 19, 20 is provided by a seal 22 which is produced by deposition of resin or adhesive on the periphery of all the electrodes and plate 17.

Figure 3A:
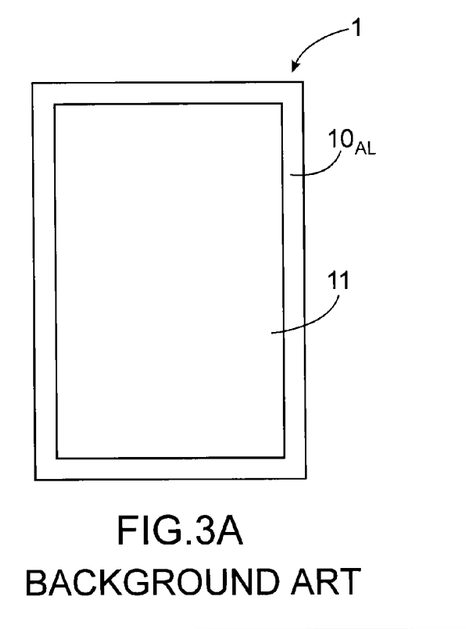
FIGS. 3A and 3B are respectively front and section views of another bipolar current collector used in a lithium bipolar battery according to the state of the art.
Figure 3B:
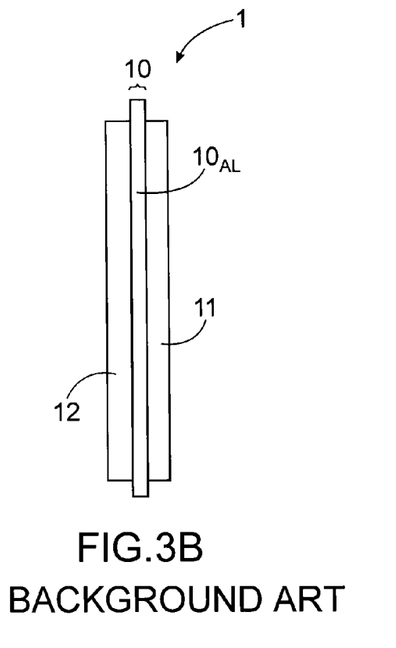
Figure 4A:
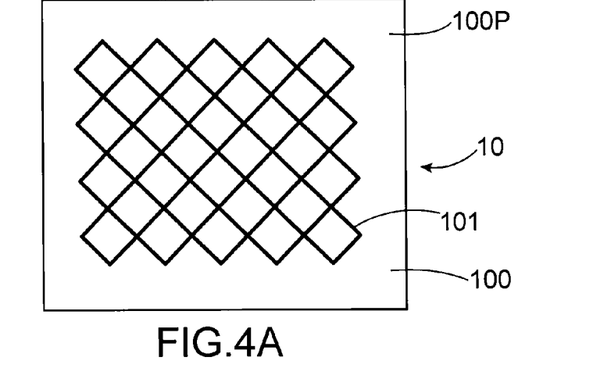
FIGS. 4A and 4B are respectively front and section views of a portion of a device according to the invention having no electrodes.
Figure 4B:
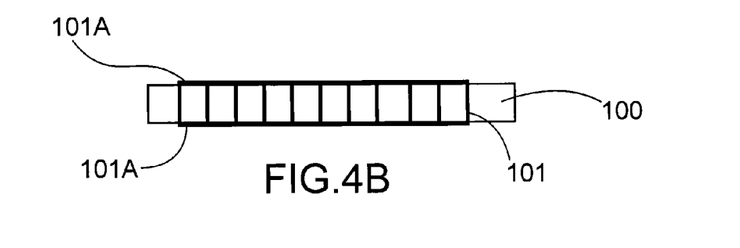

A bipolar current collector 10 or 17 according to the state of the art consists, depending on the lithium ion insertion materials used to produce the electrodes:

either of two superimposed plates, one of which, typically made of 10AL aluminium, is covered by a cathode 11 and the other of which, typically made of 10C copper, is covered by an anode 12 (FIGS. 2A and 2B), or of a single plate, typically made of 10AL aluminium, covered on one of the faces by a cathode 11 and on the other of its faces by an anode 12 (FIGS. 3A and 3B).

The main difficulty experienced in designing a bipolar battery according to the state of the art is the production of compartments which are completely sealed against the electrolyte, which is generally in liquid form, with regard to each other, as between the compartments referenced 14, 15, 16 and 18, 19, 20 in FIG. 1.

Producing seals 22 or increasing plates 10 of the bipolar electrode according to the state of the art to achieve this are not necessarily satisfactory.

The inventor therefore proposes a completely different solution for the design of a current collector.

In FIGS. 5A to 7B three different methods for producing a portion 10 of a device according to the invention have been illustrated.

According to each of these three methods, a metal grate or raised sheet 101 is obtained forming a current collector in the bipolar battery housed in a strip 100 made of insulator material, including at least one polymer, where grate or raised sheet 101 is flush with level 101A on both faces of strip 100, as can be seen in FIGS. 4B, 5B, 6B, 7B. In these figures, and also in the corresponding facing ones, 4A, 5A, 6A, 7A, it can be seen that grate or raised sheet 101 is shaped as a frame centred within polymer strip 100. In addition, grate or raised sheet 101 has a regular mesh, where each mesh is lozenge-shaped.

Figure 5:
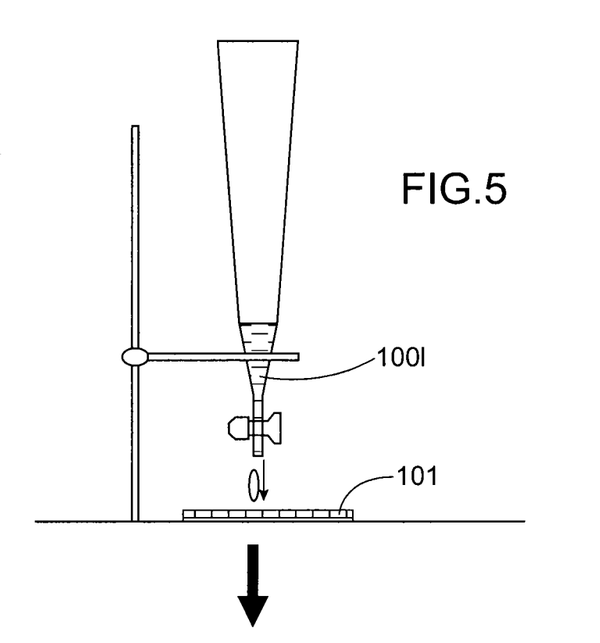
FIG. 5 is a schematic view illustrating a first method for producing a portion of a device according to the invention having no electrodes, shown with front and section views in FIGS. 5A and 5B.
Figure 5A:
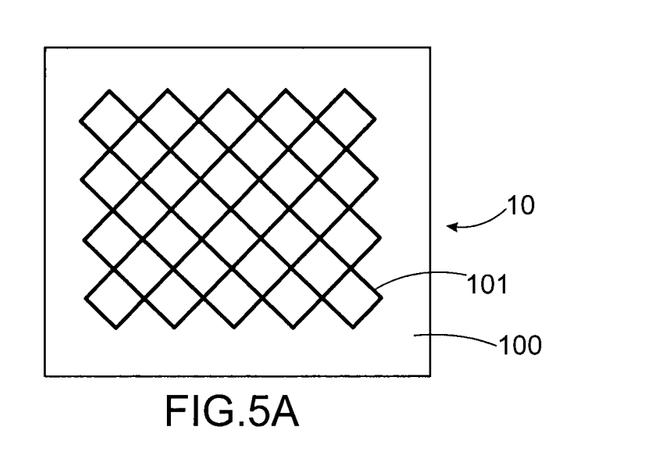
Figure 5B:
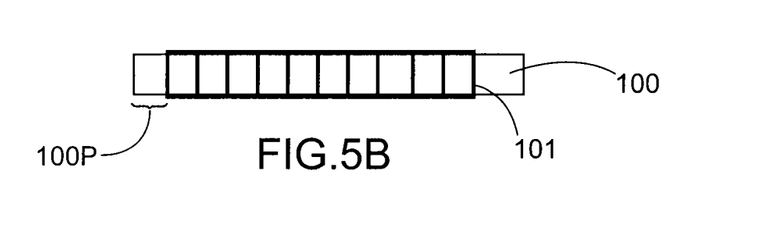

According to the method of FIG. 5, a polymer, two-component resin or polyolefin, in liquid form 100L, is heated to its melting point, and then a determined quantity, which is optimal for the application, of the polymer melted in this manner, and therefore in the form of a viscous solution, is poured on to grate 101, such that the latter is flush at the surface, either side of portion 100L made of polymer constituted in this manner. The assembly (metal grate 101 and polymer strip 100) is then left at ambient temperature in order for polymer to harden and thus attach to the conductive portion constituted by metal grate 101 into which it has been poured. Portion 10 of the device according to the invention thus has a metal grate 101 which is flush on both faces of a strip 100 made of hardened polymer. To improve the attachment of the polymer to the current collector an adherence promoter (made of an amine) may be used.

Figure 6:
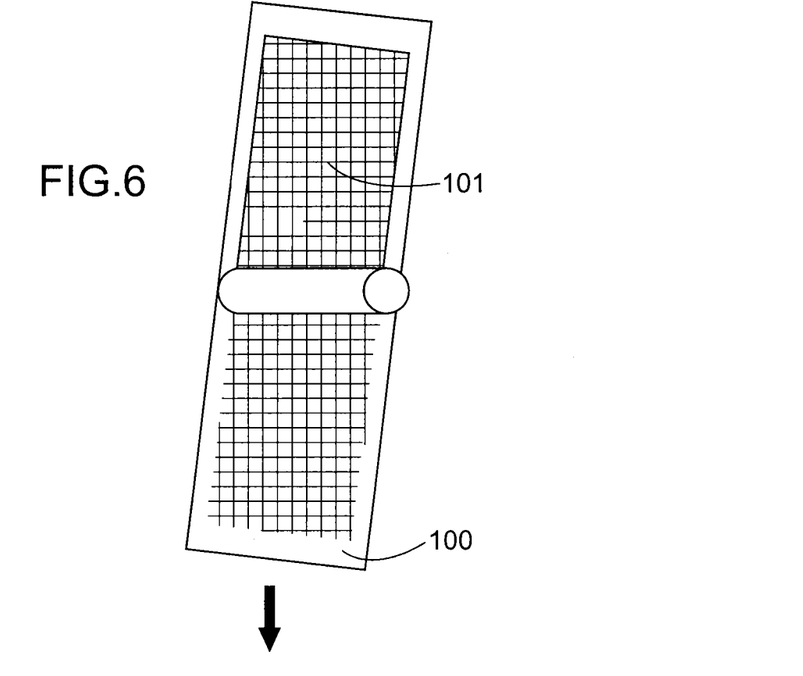
FIG. 6 is a schematic view illustrating a second method for producing a portion of a device according to the invention having no electrodes, shown with front and section views in FIGS. 6A and 6B.
Figure 6A:
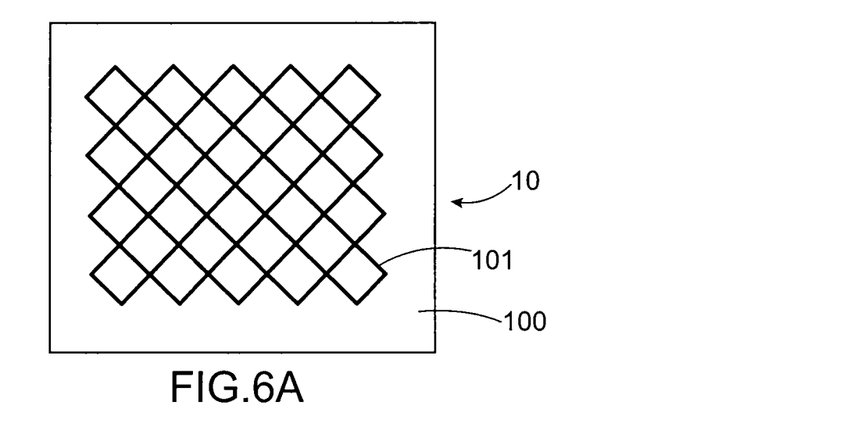
Figure 6B:
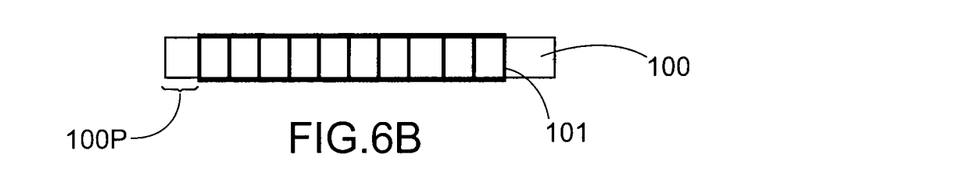

According to the method of FIG. 6, a lamination of a metal grate 101 to a polymer sheet 100 is accomplished, such that it penetrates all the way through, and that it is flush at the surface of the polymer sheet. In this case also, grate 101 is preferably shaped as a frame centred within polymer sheet 100.

Figure 7:
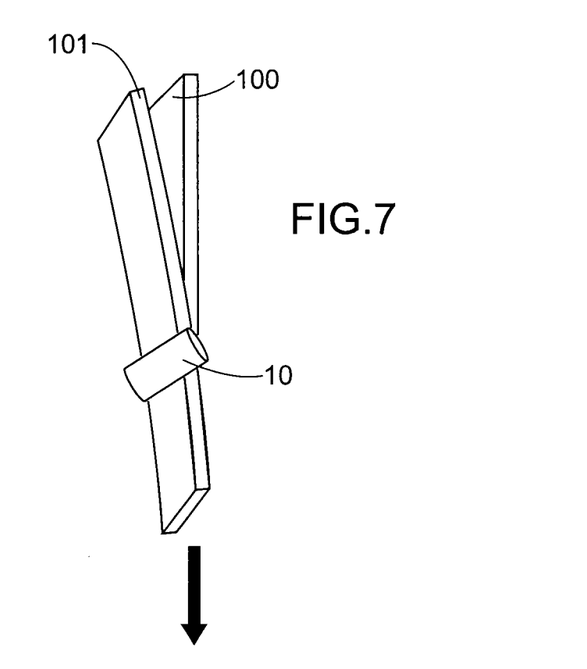
FIG. 7 is a schematic view illustrating a third method for producing a portion of a device according to the invention having no electrodes, shown with front and section views in FIGS. 7A and 7B, FIGS. 8A to 8D' are schematic views each of which illustrates a step of a method of production of a polar battery from three devices according to the invention, where step 8D' is an alternative step to step 8D.
Figure 7A:
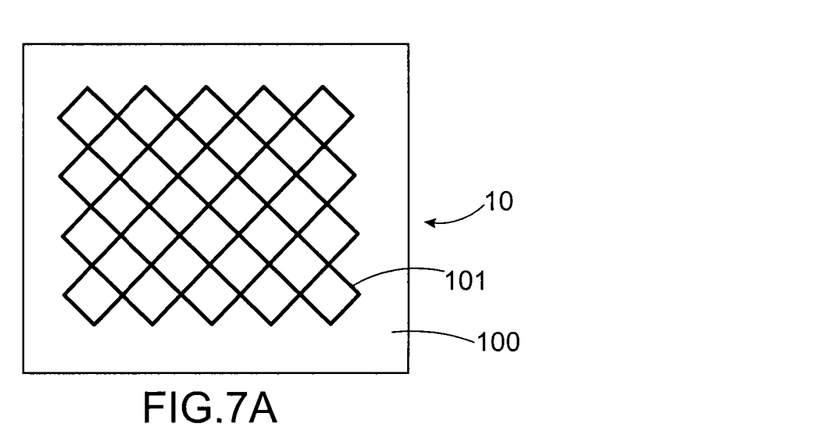
Figure 7B:
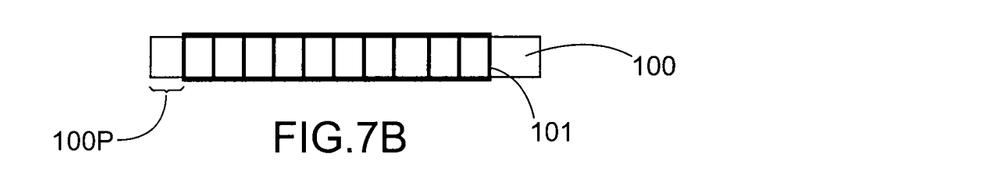

According to the method of FIG. 7, a raised aluminium sheet 101 is a laminated on to a polymer strip 100, such that it penetrates the whole of polymer 101, and such that it is flush on both faces of polymer strip 101.

Figure 8A:
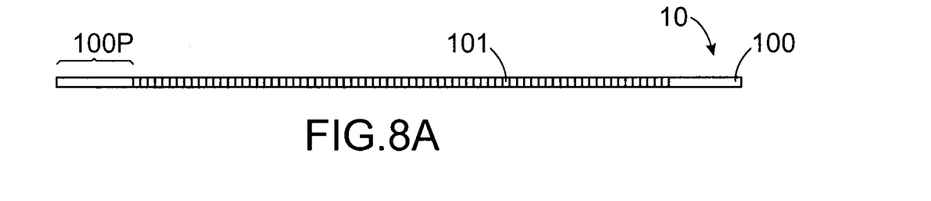

By this means, support portion 10 of the device according to the invention obtained (FIG. 8A), i.e. mixed sealing functional area 100/current collector 101 semi-finished product, is initially obtained.

The deposition of at least one electrode made of lithium insertion material is accomplished to obtain ultimately the device according to the invention.

Figure 8B:
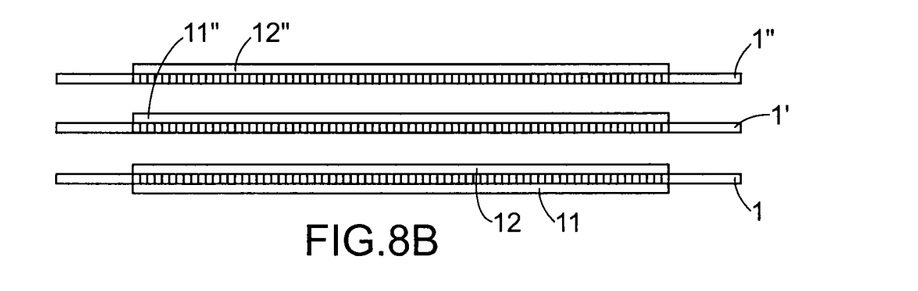

As illustrated in FIG. 8B, to produce a complete bipolar battery three separate devices according to the invention are produced:

to obtain a "bipolar" device 1, a layer 12 of negative lithium insertion material (anode), such as a layer made $Li_4Ti_5O_{12}$, is deposited on one of flush portions 101A of the grate, and a layer 11 of positive lithium insertion material (cathode), such as a layer made of LiFePO4, is deposited on other flush portion 101A of grate 101, to obtain a positive "monopolar" device 1', only a layer 11' of positive lithium insertion material (cathode), such as a layer made of LiFePO4, is deposited on one of flush portions 101A of grate 101, to obtain a negative "monopolar" device 1", only a layer 12" of negative lithium insertion material (anode), such as a layer made of $Li_4Ti_5O_{12}$, is deposited on one of flush portions 101A of grate 101.

In the case of these three devices 1, 1', 1", the layers of electrodes are advantageously produced by a printing technique (heliography, flexography or screen printing) on current collector portion 101, methodically leaving periphery 100P of polymer strip 100 without any electrodes. All electrode layers 11, 12, 11', 12' and grates 101 are roughly of the same dimensions, as are all peripheral areas 100P of the polymer strips.

A calendering step may possibly be included, in order to provide improved electron percolation within each electrode.

Figure 8C:
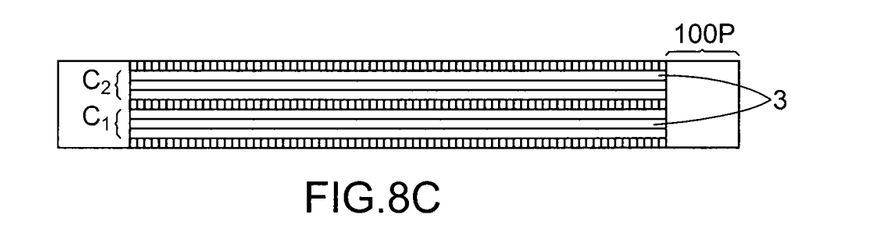

Devices 1, 1', 1" are then stacked, aligning them, with bipolar device 1, between two monopolar devices 1', 1", and separating them by an electrical insulating and ion conductive membrane 3 constituting a separator: as illustrated in FIG. 8C, a bipolar battery is then obtained with two electrochemical cells C1, C2 stacked one on the other, and with a continuous peripheral area 100P from top to bottom.

When the stack has been produced each separator is impregnated with an electrolyte. Alternatively, the electrolyte may already impregnate each separator when it is installed in the stack.

Figure 8D:
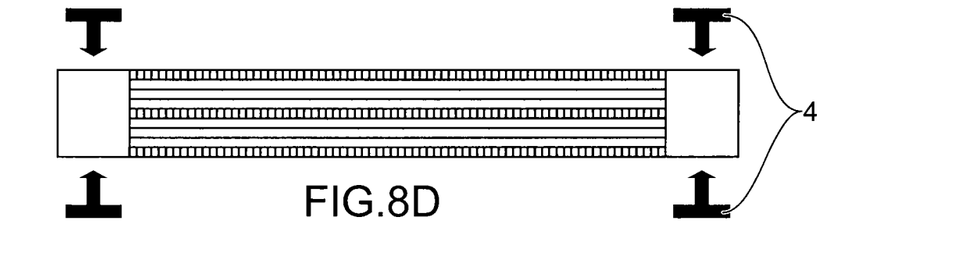

To accomplish the definitive sealing, between the compartments of such a bipolar battery, peripheries 100P of the three strips 100 of devices 1, 1', 1" are pressed against one another, and the three strips are kept pressed against one another. By this means a wall sealed against electrolytes 3 of both cells C1, C2 is constituted, which surrounds these cells from top to bottom of the stack. Two alternatives may be envisaged to accomplish this definitive sealing step:

either pressure is applied at periphery 100P of polymer strip 100 of the cells, advantageously using rigid packaging 4 of the battery (FIG. 8D), or a heat-sealing of polymer peripheries 100P is accomplished, uniformly from top to bottom, advantageously using a U-shaped jaw (FIG. 8D').

The invention claimed is:

1. A device for a lithium electrochemical generator, comprising:
    a strip made of electrical insulator material including at least one polymer and one metal grate, or one raised metal sheet, forming a current collector, housed in the strip, flush on both its faces, the metal grate or one raised metal sheet being embedded in the polymer of the strip, the periphery of the strip having no grate or raised sheet, and
    at least one of two flush portions of the grate or the raised sheet being covered with an electrode made of lithium insertion material.

2. The device according to claim 1, in which a majority polymer constituting the strip is a polyolefin.

3. The device according to claim 2, in which the strip includes at least one other polymer, wherein the other polymer is interposed between the polyolefin and the current collector to improve attachment between them.

4. The device according to claim 3, in which the other polymer is chosen from among a polyester or a polyurethane.

5. The device according to claim 2, in which the strip includes at least one adherence promoter, wherein the adherence promoter is interposed between the polyolefin and the current collector to improve attachment between them.

6. The device according to claim 1, in which a majority polymer constituting the strip is a two-component resin.

7. The device according to claim 1, in which the current collector is made of aluminum.

8. The device according to claim 1, in which the current collector is a grate or electroplated raised sheet at a surface of another metal.

9. The device according to claim 1, in which the grate has a regular mesh.

10. The device according to claim 1, in which the current collector is centered in the strip made of insulator material.

11. The device according to claim 1, in which both flush portions of the current collector are covered with an electrode made of lithium insertion material.

12. The device according to claim 1, in which a single one of the two flush portions of the current collector is covered with an electrode made of lithium insertion material.

13. A bipolar battery comprising:
    at least two electrochemical cells stacked one on the other, and at least one device according to claim 1, in which both flush portions of the current collector are covered with an electrode made of lithium insertion material, and in which one of the two flush portions of the current collector is covered with anode made of lithium insertion material of one of the two cells and the other of the two flush portions of the current collector is covered with cathode made of lithium insertion material of the other of the two cells, and
    wherein a periphery of the strip made of at least one polymer constitutes a peripheral area of a wall sealed against electrolytes of the two cells surrounding the electrolytes.

14. A bipolar battery comprising:
    at least two electrochemical cells stacked one on the other, and at least one device according to claim 1, in which both flush portions of the current collector are covered with an electrode made of lithium insertion material, and in which one of the two flush portions of the current collector is covered with anode made of lithium insertion material of one of the two cells and the other of the two flush portions of the current collector is covered with cathode made of lithium insertion material of the other of the two cells, and
    wherein a periphery of the strip made of at least one polymer constitutes a peripheral area of a wall sealed against electrolytes of the two cells surrounding the electrolytes, also including at least one device for a lithium electrochemical generator in which a single one of the two flush portions of the current collector is covered with an electrode made of lithium insertion material, the other of the two flush portions not covered by an electrode being in contact with a terminal current collector.

15. The bipolar battery according to claim 13, in which dimensions of the current collectors are equal to those of all the electrodes.

16. The bipolar battery according to claim 13, in which the anode is made of $Li_4Ti_5O_{12}$ and the cathode of $LiFePO_4$.

17. A method for producing a bipolar battery including at least two electrochemical cells stacked one on the other, the method comprising:
    a) producing a first device comprising a device for a lithium electrochemical generator, comprising a strip made of electrical insulator material including at least one polymer and one metal grate, or one raised metal sheet, forming a current collector, housed in the strip, flush on both its faces, the metal grate or one raised metal sheet being embedded in the polymer of the strip, the periphery of the strip having no grate or raised sheet, and at least one of two flush portions of the grate or the raised sheet being covered with an electrode made of lithium insertion material, in which both flush portions of the current collector are covered with an electrode made of lithium insertion material; and
    producing two devices comprising a device for a lithium electrochemical generator, comprising a strip made of electrical insulator material including at least one polymer and one metal grate, or one raised metal sheet, forming a current collector, housed in the strip, flush on both its faces, the metal grate or one raised metal sheet being embedded in the polymer of the strip, the periphery of the strip having no grate or raised sheet, and at least one of two flush portions of the grate or the raised sheet being covered with an electrode made of lithium insertion material, in which a single one of the two flush portions of the current collector is covered with an electrode made of lithium insertion material, such that:
    one of the flush portions of the current collector of one of the two devices is covered with an anode made of lithium insertion material,
    one of the flush portions of the current collector of one of the other of two devices is covered with a cathode made of lithium insertion material and, one of the flush portions of the current collector of the first device is covered with a cathode made of lithium insertion material, whereas the other of the flush portions of the current collector of the first device is covered with an anode made of lithium insertion material;

b) stacking the three devices, with sandwiching of a separator between two adjacent ones, wherein the stacking with sandwiching is accomplished such that:

the anode of one of the two devices is facing the cathode of the first device, wherein these devices are separated by a first separator, the cathode of the other of the two devices is facing the anode of the first device, wherein these devices are separated by a second separator;

c) pressing peripheries of the three strips of the devices ones against the others, each of the separators being impregnated with an electrolyte;

d) keeping the three strips pressed ones against the others to constitute a wall which is sealed against the electrolytes of the two cells surrounding the latter.

18. The method according to claim 17 of a bipolar battery including n electrochemical cells stacked individually on each other, according to which a) to d) are accomplished with (n−1) first devices and the two devices, at ends of the stack, where n is an integer.

19. The method according to claim 17, according to which c) and d) are accomplished by installation of a rigid packaging of the bipolar battery.

20. The method according to claim 17, according to which c) and d) are accomplished by heat-sealing using a U-shaped jaw around peripheral portions of the strips made of electrical insulator material.

21. The method according to claim 17, according to which deposition of at least one electrode on one of the flush portions of at least one of the devices is accomplished by a printing technique.

* * * * *